April 12, 1927.

M. A. ROLLMAN 1,624,010

FOOD RECEPTACLE

Filed Jan. 6, 1923

Inventor
Michael A. Rollman
By Davis & Davis
Attorneys

April 12, 1927.
M. A. ROLLMAN
FOOD RECEPTACLE
Filed Jan. 6, 1923
1,624,010
2 Sheets-Sheet 2
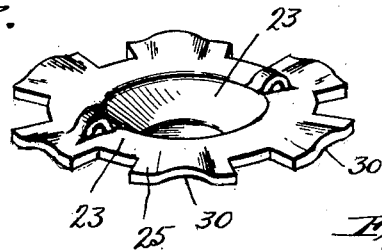
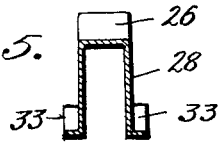
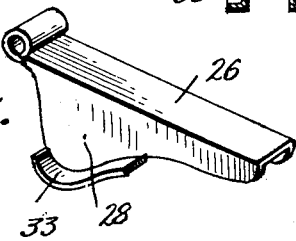
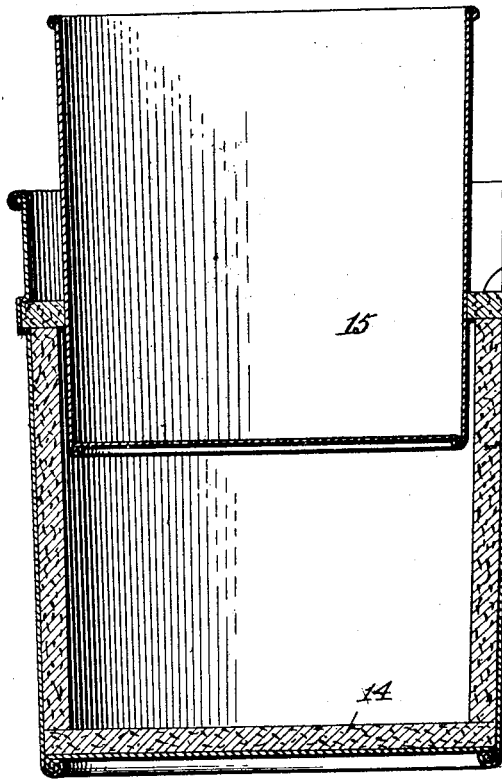
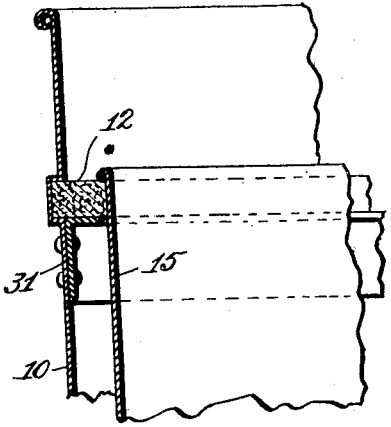
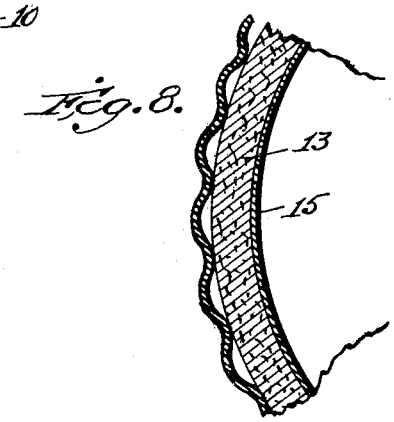
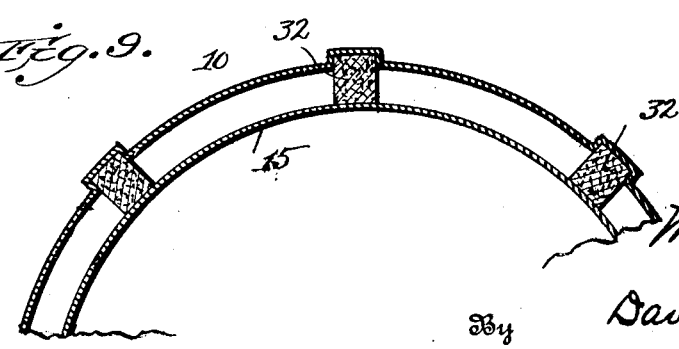
Inventor
Michael A. Rollman
By Davis & Davis
Attorneys Patented Apr. 12, 1927.

1,624,010

UNITED STATES PATENT OFFICE.

MICHAEL A. ROLLMAN, OF MOUNT JOY, PENNSYLVANIA.

FOOD RECEPTACLE.

Application filed January 6, 1923. Serial No. 611,070.

The object of this invention is to provide a simple and inexpensive bucket-like container which will preserve for a considerable time the temperature of the food articles placed in the container, thereby rendering the container a very useful appliance for use in households and by tourists and for shipping food articles, as more fully hereinafter set forth.

In the drawings—

Figs. 3, 4 and 5 are detail views of parts of the cover-locking means;

Fig. 6 is a vertical section view showing the manner in which the tapered inner container is forced down into position within the cork insulation;

Figs. 7, 8 and 9 are detail views showing slight modifications.

Figure 1:
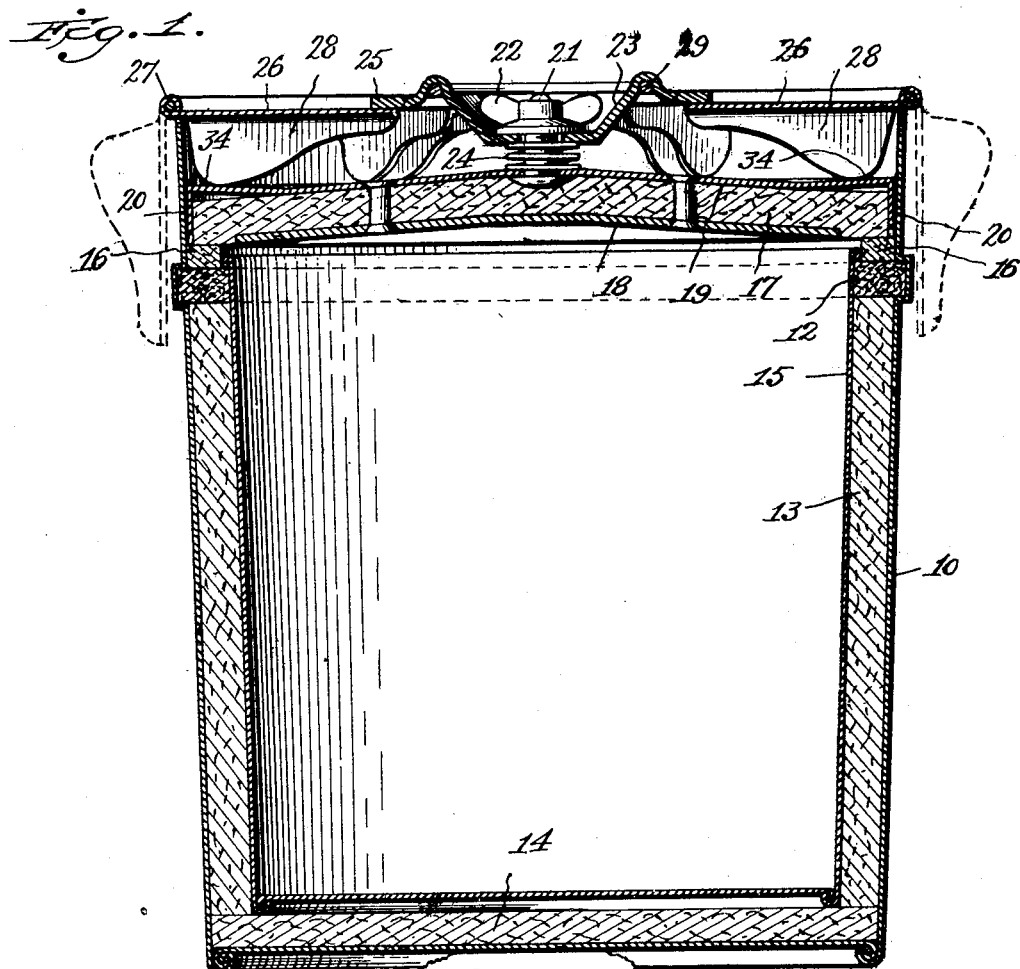
Fig. 1 is a vertical sectional view of the vessel closed.
Figure 2:
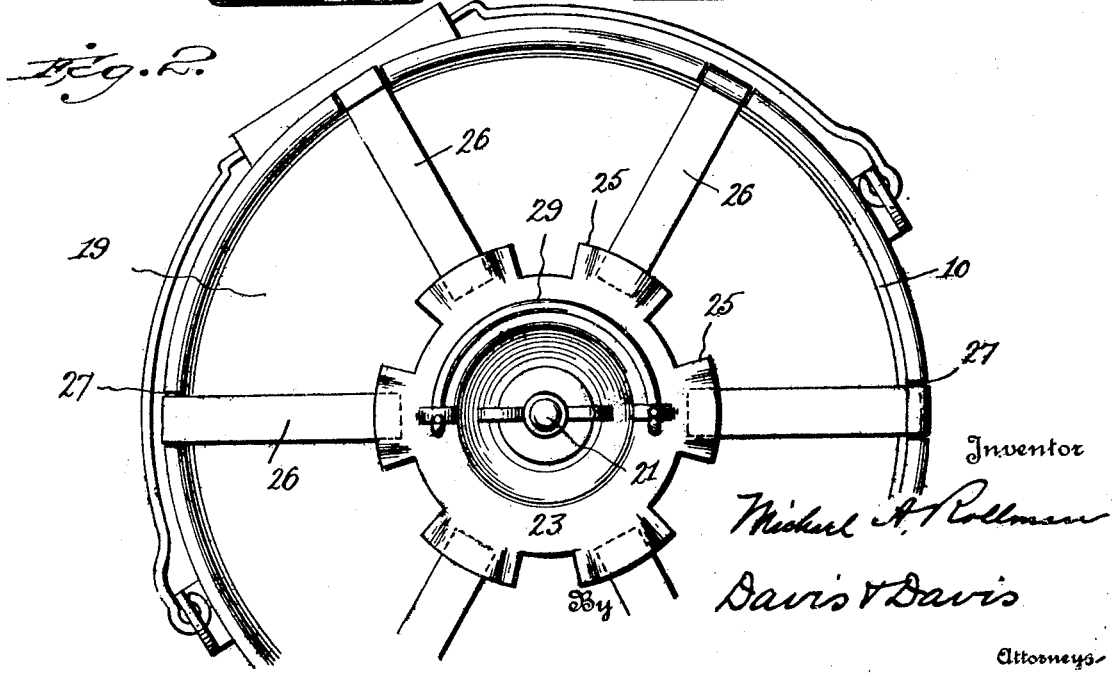
Fig. 2 is a plan view thereof.

In the drawing, 10 designates an exterior vessel tapering downwardly and desirably made of sheet-metal, this vessel being provided near its top with an annular outwardly-bulged channel 11 forming an internal seat for an annular cork ring 12. Abutting the lower side of this cork ring 12 is a cylindrical cork lining 13, the lower end of this cylinder of cork abutting against the bottom disk 14, also of cork. An inner metal container 15 is fitted down into this cork-lined chamber, this inner container being tapered downwardly to fit the tapered cylindrical wall of the cork lining. To anchor this inner container in position, I make the cross-sectional diameter of the ring 12 such that this ring tightly fits the lower end of the inner container when the same is inserted into the ring, so that by forcibly pressing the inner container down into the main vessel, the tapered wall of the inner container will compress the cork ring 12, thereby forcibly pressing this ring into the channel 11 and causing it to tightly grasp the inner container when the same has been forced completely down into the cork lining. In this way, I provide not only for thoroughly and completely insulating the inner vessel, but also for anchoring it tightly in place, altho it will be obvious that the inner container may be withdrawn when desired.

On top of the compressed ring 12 is placed another ring of cork 16, the upper surface of which lies in a plane above the rim of the container 15 and against which abuts the cork body 17 of the cover. This cover consists of an under disk 18 and an upper disk 19, between which is a cork layer 17. The outer edge of the under disk 18 terminates short of the outer edge of the cover, so as to insure the cork body 17 bearing directly against the cork ring 16, so that the metal elements inside of the container shall be completely insulated from the metal elements outside. For the purpose of maintaining the cork body 17 in position. the upper disk 19 is provided with a flange 20 at its outer edge, which fits against the interior wall of the main bucket and against the outer edges of the cork disk 17. The cover, as will be observed, fits down within the outer vessel and seats upon the ring 16 at a point a distance from the top of the outer vessel.

For removably locking the cover in place, I employ the following devices. Upstanding from the center of the cover is a non-rotative threaded bolt 21 and on this bolt is threaded a wing-nut 22 which serves to clamp a disk 23 down against the upper end of a coil-spring 24 which rests upon the upper side of the cover and is compressed by screwing down the nut on the bolt. The disk 23 is dished centrally to form a pocket for the wing-nut to thereby get it out of the way, i. e., below the plane of the top of the bucket. The edge of the disk is provided with radial lugs 25 which are adapted to bear on the upper faces of levers 26 pivoted at their outer ends on the rim-wire 27 of the bucket and provided with depending cam-flanges 28 which are shaped so as to bear upon the upper face of the cover at a point near the wall of the bucket. By forcing down the disk by means of the wing-nut, the inner, free ends of the levers 26 are correspondingly forced downwardly, thereby causing the cams 28 to press the cover firmly to its seat.

By rotating the disk 23 slightly on the bolt, the lugs 25 pass off the ends of the levers 26 and thus free them, whereupon they may be swung upwardly and over to permit them to depend outside of the bucket, as shown in dotted lines in Fig. 1, whereupon the cover may be removed, a bail 29 being pivotally mounted on the disk for convenience in pulling the cover outwardly. Desirably, each of the lugs 25 is provided with a recess 30 on its under side to form a pocket for the end of the lever 26 to thereby insure against accidentally releasing the levers by rotation of the disk. By pivoting the levers on the rim-wire of the bucket, it will be observed that when they are thrown outwardly, they will hang entirely outside of the bucket and will, therefore, offer no interference to removal of the cover; and, when the cover is removed, it will be observed that the mouth of the bucket is wide open, there being no obstructions whatever within the bucket that will interfere with removal of the contents in the container. It will be observed also that this manner of fastening the cover in place is so simple that a very young or feeble person may lock or unlock the cover, and, even with a slight pressure in fastening the closure in place, the cover will be effectively fastened in position and completely insulate the contents of the vessel. It will be understood that before rotating the disk to release the levers, the wing-nut will be unscrewed to release the pressure, to thereby make the matter of rotating the disk a very easy one. Each of the levers is desirably formed of sheet-metal stamped up from a single piece in channel form.

Instead of having the space between the inner vessel 15 and the outer bucket filled with cork, I may omit the cork and use air alone as an insulating medium, as shown in Fig. 7, but in this case it is desirable to support the compressed ring 12 by an annular angle-iron 31 riveted to the bucket underneath the ring 12. I might also desire to vertically corrugate the outer vessel, as shown in Fig. 8; and, as shown in Fig. 9, I may, instead of using a solid lining of cork as in Fig. 6, use spaced strips 32 running vertically between the two vessels and held in place by channeling the outer vessel. It will also be understood that various other modifications of the detail construction may be made without departing from the spirit of the invention as defined in the claims.

As shown in Figs. 4 and 5, the depending sheet-metal cams 28 may be provided with lateral flanges 33 to prevent the narrow sheet-metal edges of the cams from cutting into the sheet-metal cover. As will be observed in Fig. 1, the sheet-metal disk 19 is bulged upwardly and inclined upwardly and outwardly at 34, i. e., near the margin of the disk, where the active faces of the cams rub, to assist in obtaining the required pressure on the cover.

What I claim as new is:

1. A food container consisting of an outer metallic vessel, an inner metallic vessel, a cover fitting within the outer vessel and adapted to close the inner vessel, devices for locking the cover in place, and means for completely insulating the inner vessel from all metallic contact with the outer vessel, said means embodying a cork ring fitting between the vessels and having a seat in an annular groove in one of the vessels formed therein at a distance from the top edge thereof.

2. A food container consisting of an outer metallic vessel, an inner metallic vessel, a cover fitting within the outer vessel and adapted to close the inner vessel, devices for locking the cover in place, and means for completely insulating the inner vessel from all metallic contact with the outer vessel, said means consisting of a body of cork enclosed in the cover, and a cork ring contacting with this body of cork at the edge thereof and adapted to receive the thrust of the pressure caused by fastening down the cover, said cork ring being held against movement with respect to the outer vessel by being compressed into an annular channel formed in said outer vessel at a distance from its top edge.

3. A food container consisting of an outer metallic vessel, an inner metallic vessel, a cover fitting within the outer vessel and adapted to close the inner vessel, and devices for locking the cover in place, said devices embodying a series of cam-levers radially arranged and central pressure means for actuating all the levers simultaneously, said levers being each pivoted to the rim of the outer vessel and adapted to be swung outwardly entirely out of the vessel.

4. A food container consisting of an outer metallic vessel, an inner metallic vessel, a cover fitting within the outer vessel and adapted to close the inner vessel, and devices for locking the cover in place, said devices embodying a series of cam-levers radially arranged and central pressure means for actuating all the levers simultaneously, said levers being pivotally mounted on the rim-wire of the outer vessel.

5. In a food receptacle, an outer vessel, a shorter inner vessel insulated from the outer vessel, a cover fitted down upon the inner vessel and within the rim of the outer vessel, said cover having upwardly-inclined cam faces on its top face, and means for fastening the cover mounted partly on the outer vessel and partly on the cover and embodying cam levers whose cam surfaces work against the cam surfaces of the cover.

In testimony whereof I hereunto affix my signature.

MICHAEL A. ROLLMAN.